Sept. 16, 1924.

J. B. FLICK

UNIVERSAL JOINT

Filed Nov. 9, 1921

Sept. 16, 1924.   1,508,653
J. B. FLICK
UNIVERSAL JOINT
Filed Nov. 9, 1921   3 Sheets-Sheet 2

Inventor
John B. Flick
By
Alexander Dowell
Attorneys

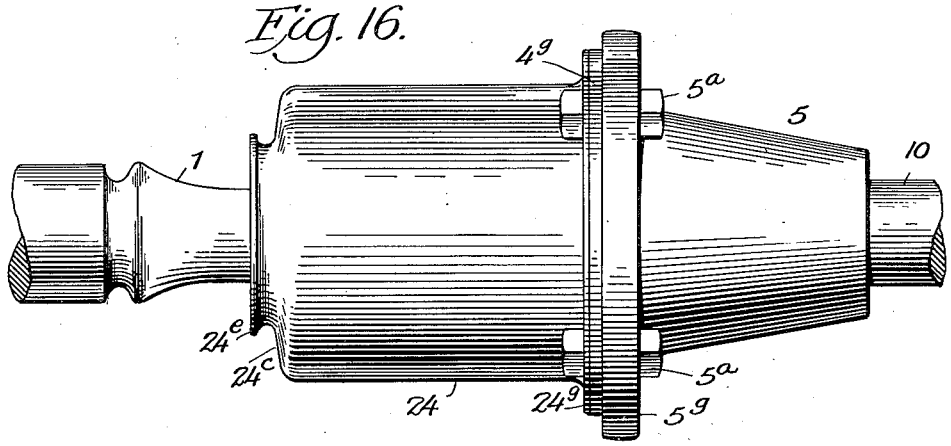
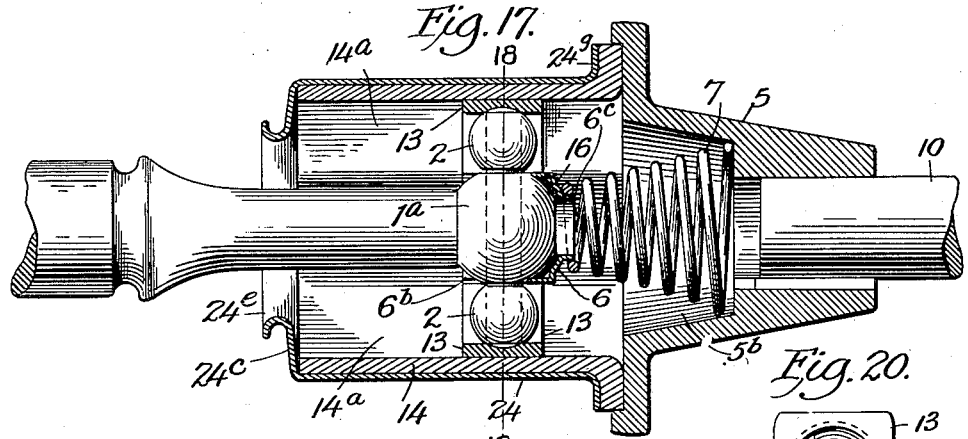
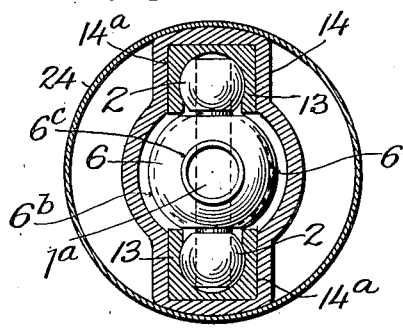
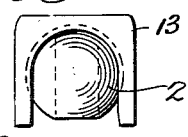
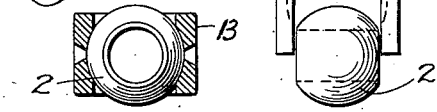
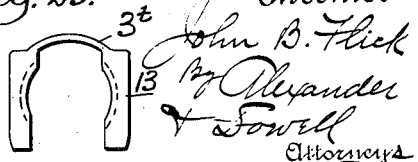

Patented Sept. 16, 1924.

1,508,653

UNITED STATES PATENT OFFICE.

JOHN BENJAMIN FLICK, OF DETROIT, MICHIGAN.

UNIVERSAL JOINT.

Application filed November 9, 1921. Serial No. 513,957.

*To all whom it may concern:*

Be it known that I, JOHN B. FLICK, a citizen of the United States, residing at Detroit, in the county of Wayne and State of Michigan, have invented certain new and useful Improvements in Universal Joints; and I hereby declare that the following is a full, clear, and exact description thereof, reference being had to the accompanying drawings, which form part of this specification.

This invention relates to universal joints or shaft couplings for use in transmitting power from a driving to a driven shaft, and is more particularly designed for use in the driving mechanism of automobile vehicles and in other machines where one shaft must be capable of angular displacement relative to the other shaft. In general construction the joint is of that character in which one shaft is provided on its end with a transverse pin carrying rollers or balls which engage diametrically opposite slots in a casing member fixedly attached to the adjacent end of the other shaft, the engagement between the T head on one shaft and the slotted member on the other shaft insuring simultaneous rotatorial movement of the shaft and at the same time permitting angular displacement of one shaft relative to the other in two perpendicular intersecting planes, thus forming a universal joint or connection between the two shafts. This type of connection not only permits a universal angular movement of one shaft relative to the other, but also permits a slight endwise longitudinal play of one shaft relative to the other, thus peculiarly fitting such joint for use in the transmission gear of automobile vehicles as well as for use in power driven transmission mechanisms wherein such a joint is desirable.

In universal joints of this type as heretofore constructed the bearing contact between the rollers or balls and the slots has been limited to a line on the circumference of the ball or roller engaging a similar line on the concave surface of the related slot, and consequently if there was but little longitudinal endwise play of the shafts all the strain would be exerted practically continuously on the small line of surface contact between the balls and walls of the slots, and in practical use serious wear would frequently develop and the joint become impaired.

The principal object of the present invention is to provide a universal joint of the general type aforesaid in which there will be a large extent of spherical surface contact between each ball and the opposed part, instead of a mere line of contact, thus reducing wear and greatly increasing the efficiency and durability of the joint.

In the type of joint above mentioned it has also been customary to place a spring in the housing normally tending to keep the shafts separated lineally, and to prevent lost motion or rattling due to relative endwise motions of the shafts, which motions occur more or less frequently when such joints are used in the transmission gearing of automobile vehicles and trouble has been experienced in such joints by reason of the spring cutting into the end of the shaft with which it engages, and because the rocking of the shaft tends to displace the spring, and cause it to operate inefficiently.

Therefore a further object of the present invention is to provide novel means for preventing such spring wearing the end of the shaft, and for keeping the spring always in correct operative position thereby enhancing the durability of the spring and lessening the wear on the parts.

I will describe the invention with reference to the accompanying drawings in which I have illustrated a universal joint or coupling embodying the invention, and an explanation thereof will enable others to understand and use the same, and in the claims I have summarized the essentials of the invention and the novel features of construction and novel combinations of parts for all of which protection is desired.

In said drawings:

Fig. 16 is a side elevation of a slight modification of the universal joint casing.

Fig. 17 is a longitudinal section through Fig. 16 parts being shown in elevation.

Fig. 18 is a transverse section on the line 18—18 Fig. 17.

Figs. 19, 20 and 21 are detail views of the ball and sleeve member shown in Figs. 17 and 18.

Fig. 22 is a detail section on the line 22—22 Fig. 19.

Fig. 23 is a detail view showing a slight modification of such sleeve.

Figure 6:
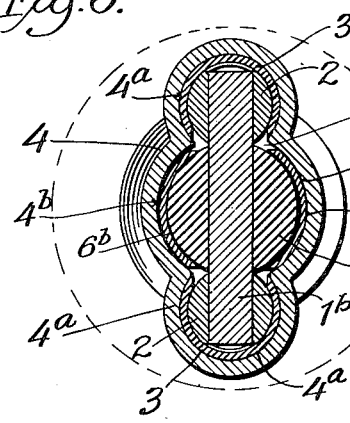
Fig. 6 is a transverse section on the line 6—6 Fig. 2.

In the construction illustrated in Figs. 1 to 15 of the drawings 1 designates part of a shaft having a ball head $1^a$ which is transfixed by a pin $1^b$ that projects at opposite sides of the ball head $1^a$ and forms trunnions upon which are mounted rollers or balls 2. As shown each ball 2 is practically truly spherical, but has two polar sections thereof flattened, one of the flattened surfaces being adjacent the ball-head $1^a$ and the other at the side farthest removed from the ball-head $1^a$. Each ball 2 is formed with a diametrical bore to receive and snugly fit the end of pin $1^b$, as shown in Figs. 2 and 6, the flattened parts of the ball being at and concentric with the ends of the bore.

When the parts are assembled the balls 2 are entered into longitudinal slots $4^a$ in the part 4 of the casing preferably composed of two separable members 4 and 5, as shown in the drawings. Part 4 of the casing is preferably provided with an axial passage $4^b$ (preferably slightly larger in diameter than the ball-head $1^a$ for the accommodation of the ball cap hereinafter referred to), adapted to be traversed by said ball-head; and at diametrically opposite sides of passage $4^b$ are slots $4^a$, which may be of any suitable cross section being shown as cylindric in Figs. 4 and 6. These slots $4^a$ open at their inner sides into the outer sides of the passage $4^b$, as shown, to permit movement of the pin $1^b$.

Figure 4:
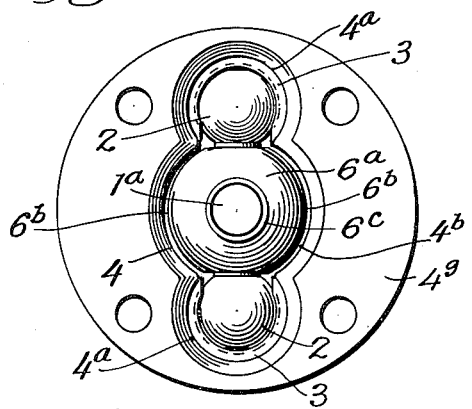
Fig. 4 is an interior view of the universal joint with the spring and rear part of the housing removed.
Figure 5:
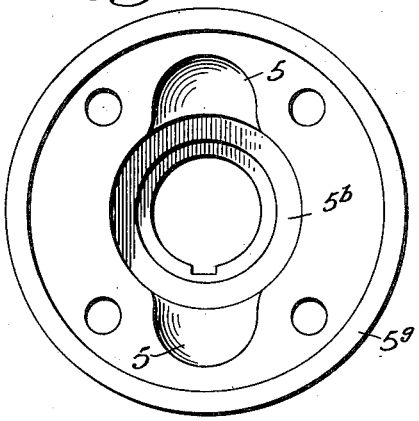
Fig. 5 is a face view of the rear part of the housing.

The part 4 is preferably closed or contracted at its outer end except for an opening $4^c$ approximately corresponding in diameter to passage $4^b$, and through which opening the shaft 1 extends. This opening may be surrounded by a flange $4^e$ for the attachment of the usual dust guard. The inner end of the part 4 is provided with a flange $4^g$ which is fastened to a corresponding flange $5^g$ on the end of a complemental casing part 5. The parts 4 and 5 of the casing may be fastened together by bolts $5^a$ transfixing the flanges $4^g$, $5^g$, or in any other suitable manner, the particular exterior form of the parts 4 and 5 of the casing and the manner of connecting the parts thereof forms no part of the present invention, but the casing should be so constructed that the slots $4^a$ open into the bore $4^b$, and that the part 5 be detachably attached to the part 4 so that part 4 of the casing may be slipped endwise over the ball-head of shaft 1 until the balls 2 are entered into the slots $4^a$ as shown in Figs. 2, 4 and 6 of the drawings. The parts 4 and 5 should be fastened together after the other parts hereinafter referred to have been properly assembled in the casing. The part 5 is adapted to be keyed to a shaft 10 normally in axial alinement with the shaft 1.

In universal joints of this type heretofore made, the balls 2 have been fitted directly into the slots $4^a$ and have merely equatorial lines of contact with the walls of the slots. In my invention the slots $4^a$ are made of larger diameter than the diameters of the balls and a bearing member or sleeve is interposed between the balls or rollers and the walls of the slots and so constructed and arranged as to afford enlarged extent of actual contact as bearing surface between the balls or rollers and the bearing member or sleeve—and between the bearing member or sleeve and the walls of the slots.

Figure 7:
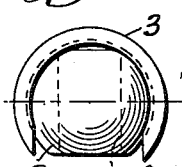
Figs. 7, 8 and 9 are detail views of one of the balls and its sleeve.
Figure 8:
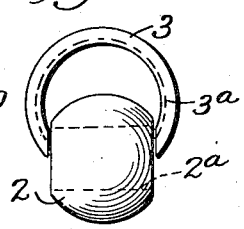

In the construction shown in Figs. 1 to 15 each ball 2 is fitted into a sleeve or bearing member 3 which is exteriorly shaped to conform to a transverse section of the interior slot $1^a$ and has an interior opening less in diameter than the greatest diameter of the ball 2; and said sleeve preferably has an opening or slot in one side slightly wider than the shortest or polar diameter of the ball, and through which slot the ball can be inserted or removed if positioned as indicated in Fig. 8. The sleeve has a partispherical recess or recesses $3^a$ within it corresponding in diameter to the longest diameter of the ball 2; and as the opposed surfaces of the ball and recesses are spherical and conformable one to the other when the ball is inserted in the sleeve (as indicated in Fig. 8) and then turned around (as indicated in Fig. 7) the ball will fit closely within the recess groove $3^a$ and be retained in the shell, and while free to rotate within the shell cannot escape therefrom (unless it be turned to the position indicated in Fig. 8).

Figures 9, 10:
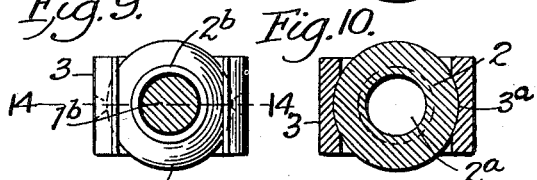
Fig. 10 is a section on the line 10—10 Fig. 7.
Figure 11:
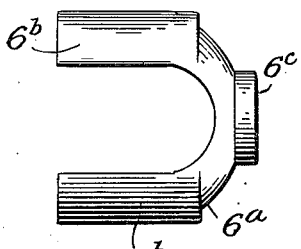
Figs. 11, 12 and 13 are detail views of the protecting shell or cap for the ball end of the shaft.
Figure 12:
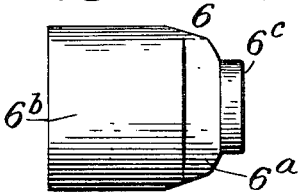
Figure 13:
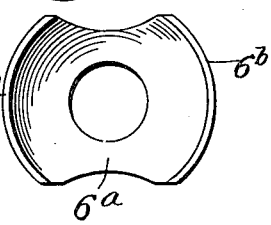
Figure 14:
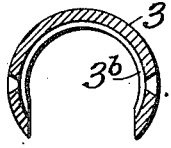
Fig. 14 is a transverse section on the line 14—14 Fig. 9.

After the balls 2 are inserted in the sleeves, as in Figs. 7 and 9, the balls are slipped upon the ends of the pin $1^b$ (as in Figs. 4 and 6) then the sleeves 3 are turned so that they will enter the slots $4^a$ in the part 4, (as shown in Figs. 2, 4, 6) then the part 5 is fastened to part 4.

When the parts are thus positioned the ball-head $1^a$ of shaft 1 is pivotedly mounted by pin $1^b$ on balls 2; the latter are supported in sleeves 3 while free to turn on the pin $1^b$ and in the sleeves; and that the sleeves are slidably supported in slots $4^a$ while free to slide therein within the part 4 of the casing.

By reference to Fig. 10 it will be seen that instead of each ball having merely a narrow equatorial line of bearing contact with the surface of the wall or part from or against which pressure is to be exerted; it has a large parti-spherical extent of surface contact with the sleeve, practically for the whole width of the recess $3^a$ and for a substantial part of the circumference of the sleeve, there being a large extent of spherical surface contact, both vertical and horizontal between the ball and sleeve (see Figs. 7, 9 and 10).

This large amount of surface contact is a great practical advantage, as it obviously greatly lessens wear and increases and enhances the durability of the parts.

It will be further observed, that instead of each ball having a mere equatorial line of contact with the inner wall of the slot, it has a large extent of parti-spherical surface contact (as indicated in Figs. 2, 4, 6, 7 and 10) with the sleeve 3, and the latter has a surface bearing contact with the wall of the slots $4^a$ equal to the length and diameter of the sleeve.

If the shaft 1, when in the position indicated in Fig. 2, should swing horizontally then the ball-head $1^a$ would oscillate pin $1^b$ and tend to throw one ball 2 to the left and the opposite ball 2 to the right thus tending to swing them out of the slots $4^a$; but instead of the balls merely rolling in the slots $4^a$ they will cause the sleeve 3 to slide longitudinally in the slots, and permit the free tilting of the ball-head.

Figure 15:
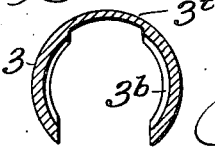
Fig. 15 is a similar section of a slight modification of the ball sleeve member.

In Figs. 4, 6, 7 and 8 the sleeve 3 is shown as approximately cylindric or annular, and of practically uniform transverse cross section throughout, but if desired, and particularly if the sleeve is made by stamping, the portion of the sleeve opposite the opening therein may be thinned as shown in Fig. 15. The thrust or pressure of the ball is always exerted on a part of the sleeve approximately at right angles to the bore in the ball; therefore, if desired, the intermediate portion of the sleeve opposite the opening therein could be thinned as indicated at $3^t$ in Fig. 15. This thinned portion $3^t$ will act as a spring to hold the sleeve in proper shape or lightly clasped around the ball; and would enable the ball to be made truly cylindric and sprung into the sleeve through the opening or slot therein. Therefore in its broader aspects I do not consider the invention restricted to any particular form of the sleeve, or intermediate bearing part 3; the essentials thereof being that it be interiorly provided with a parti-spherical recess conforming to the periphery of the ball at the point or points where the thrust or pressure is transmitted or exerted thereon; and preferably the sleeve should be formed externally to ensure ample surface contact with the walls of the slot with which it is to be engaged.

In the slight modification shown in Figs. 16 to 23 inclusive the sleeve 13 is formed interiorly like the sleeve 3 above described but it is exteriorly approximately rectangular in form to fit the corresponding approximately rectangular slots $14^a$ in the casing member 14, hereinafter referred to.

In order to prevent any chatter between the shafts 1 and 10 by reason of relative longitudinal movements thereof and consequent longitudinal movement of the ball-head $1^a$ within the part 4, springs have been placed in the casing between the inner end of the shaft 10 and the ball-head $1^a$ of the shaft 1, the inner end of the spring pressing directly against the ball-head; and in such cases every time that the ball head $1^a$ rocked right or left the spring had to swing with it or slide upon it, and the spring being of harder metal than the ball-head it would ultimately cut the head producing consequent chattering and irregular action. To overcome these objections and to enable a lighter spring to be employed, keep the device quiter, and protect the ball-head and spring from wear, I preferably provide a novel ball-head protector and spring centering device. As shown in the drawings this device comprises a cup-shaped member 6 preferably formed of thin pressed steel, or other suitable metal (see Figs. 11 to 13) having a parti-spherical end portion $6^a$ preferably adapted to fit to the inner end of the ball-head, and provided with diametrically opposite parti-cylindric leg portions $6^b$ which are adapted to extend on opposite sides of the ball-head and engage the walls of the axial passage $4^b$ (see Figs. 3, 4, 6 and 17).

The parts $6^b$ of the cap guide it in its longitudinal movements in the casing with the ball-head, but prevent the cap oscillating or turning with the ball-head. The ball-head 1 can move freely in all directions within the cap while the cap is capable of only a longitudinal sliding movement in the passage 4$^b$ to follow up the ball-head in its longitudinal movements in the casing 4.

A stout helical spring 7 is interposed between the cap 6$^a$ and the end of the shaft 10. The part 5 being provided with a recess 5$^b$ adjacent the inner end of the shaft 10 for the accommodation of the body of the spring 7, as indicated in Figs. 2 and 3.

This cap 6 is preferably provided with an opening in its outer end surrounded by a flange 6$^c$ with which the inner end of spring 7 is engaged. The pressure of the spring is transmitted through cap 6 to the ball-head 1$^a$. The ball head can rock within the cap 6$^a$, and its rocking motions will not be transmitted to the spring 7. The extensions 6$^b$ of the cap pressing against the sides of the slot 4$^b$ prevent the cap rocking with the ball 1$^a$ but permits it to freely slide with the ball-head under the action of the spring 7; the cap protecting the ball-head from wear and maintaining the spring 7 in exact axial alinement with shaft 10 at all times.

Figure 1:
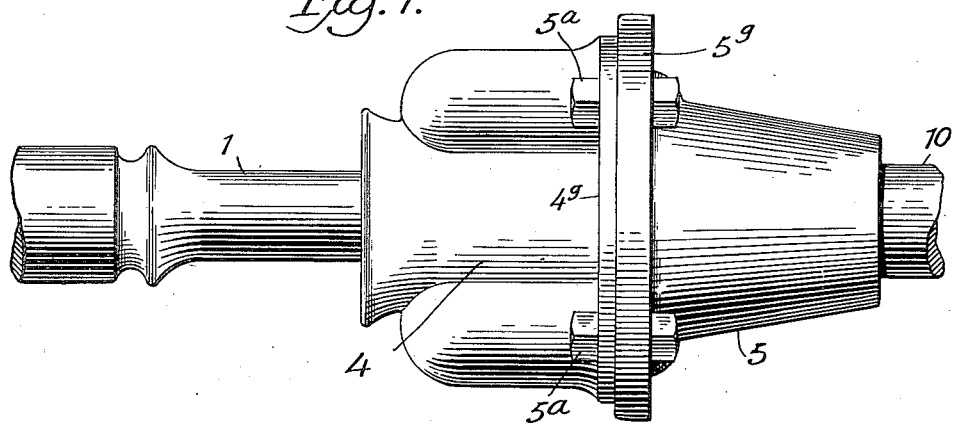
Fig. 1 is a side view of a complete universal joint embodying the invention.
Figure 2:
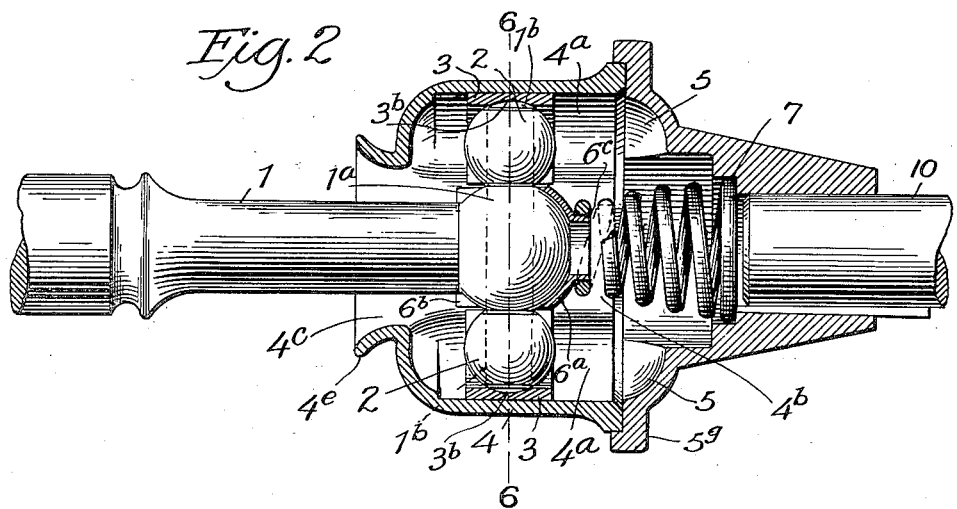
Fig. 2 is a vertical longitudinal section through such universal joint, some of the interior parts being shown in elevation.
Figure 3:
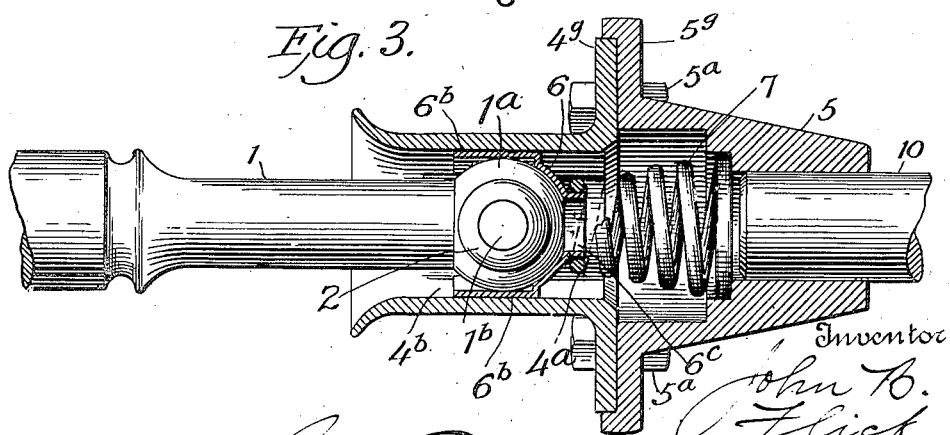
Fig. 3 is a longitudinal section in a plane at right angles to Fig. 2 some of the parts being shown in elevation.

In the form shown in Figs. 16 to 23 the part 14 of the casing approximately corresponds in function and construction to the part 4 in Figs. 1 and 2, but part 14 is preferably open ended, and the slots 14$^a$ instead of being cylindric are approximately rectangular in cross section, and the sleeve members 13 are externally shaped to slidably fit in the slots 14$^a$.

The outer ends of the slot 14$^a$ may be closed by a cylindric shell 24 which is provided with an exterior flange 24$^c$ on its outer end having an opening surrounded by a flange 24$^e$ as indicated in the drawings. This shell 24 has a flange 24$^g$ on its inner end fastened to the casing by the same bolts which unite the parts 14 and 15.

The parts shown in Figs. 16 to 23 corresponding to parts shown in Figs. 1 to 15 are similarly numbered and the operation of the parts shown in Figs. 16 to 23 is the same as that already described, and will be readily understood from the foregoing description and from the drawings. As shown in Fig. 17 a washer 16 may be placed within the cap 6 and between the collared end of cap 6 and the ball-head 1$^a$.

When the parts are assembled the space between the ball-head 1$^a$ and the shaft 10 should be packed with grease, so all the parts will be properly lubricated during the operation thereof.

As stated in the present invention each ball 2, instead of having a mere narrow equatorial line of contact with the wall of the slot 4$^a$, has a large parti-spherical extent of surface contact with a sleeve 3; and each sleeve 3 has a surface contact with the walls of slots 4$^a$ equal to the length of the sleeve plus approximately one-half of the exterior circumference thereof; whether the thrust or pressure be exerted to the right or the left. At the same time each ball is free to slide and turn on the pin 1$^b$, and to rotate within its sleeve 3, and each sleeve 3 is free to slide up and down, or back and forth, in its slot 4$^a$.

This construction is particularly useful in cases where there is little relative longitudinal play of the shafts 1 and 10 and therefore the pressure or thrust is transmitted through the ball 2, sleeve 3 and slot 4$^a$ at practically one point; if there was merely an equatorial line of contact (as in prior devices) the pressure long exerted on such narrow line will cause the ball or slot to wear and ultimately weaken or destroy the joint; but in my invention because of the large extent of parti-spherical surface contact provided between the balls and the sleeves, and the large amount of surface contact provided between the sleeves and the walls of the slots, long continued transmission of pressure from shaft 1 to 10, or vice versa, without any relative lineal movements of the shafts, or angular movements thereof will have no appreciable wearing effect upon the balls, sleeves or slots, nor seriously impair strength and efficiency of the joint.

A further advantage of the aforesaid ball and sleeve construction, is that if the coupling is used practically continuously or principally to drive the shaft in one direction, thereby ultimately producing wear between the ball and one side of the sleeve, or between one side of the sleeve and the slot, such wear may be easily compensated for by simply opening up the coupling and reversing the sleeve in the slot thus removing the worn surface of the sleeve from the point of contact and bringing the unworn surface of the sleeve into position for service.

The operation of the parts will be obvious from the drawings and from the foregoing description and the capabilities of the novel ball and sleeve members for use with a variety of forms of shafts and casings will be obvious to those skilled in the art; also the capabilities of adapting the cap 6 to various forms of ball-heads will be obvious; and in its broader aspects I do not consider the invention limited to the particular form shown.

It will be seen from the foregoing that in this invention I have increased the extent of bearing surface between the balls and the walls of the guide slots in any and all angular positions of the shaft. That the actual extent of bearing and contact surfaces between the balls and the housing is increased without having to enlarge the balls. That the device can be constructed with machined slots in the housing, and the expense of grinding the slots in the housing to mathematically exact conformity with the diameters of the balls is obviated; that means are provided for preventing the expansion spring wearing the ball-head; that the spring is always kept in true operative position; that the removable and changeable cap fitting the end of the ball head or shaft permits oscillatory or universal movement of the ball-head relative to the end of the spring without causing chattering of the spring, and protects the ball-head from wear; that the sleeve members retain the balls in position and afford truly spherical bearing surfaces of comparatively large area between the exterior of the balls and interior of the sleeve members, and said sleeve members prevent wear between the balls and the sides of the slots; that the slots in the casing may be of any desired diameter or cross section and the sleeves exteriorly conformed thereto; and that the necessity of expensive grinding of the slots to an exact dimension is obviated, and that the durability and wearing qualities of the joint is enhanced, the cost of construction greatly reduced, and its efficiency increased.

I do not herein claim the cap member, as such member forms the subject matter of a separate application.

What I claim is:

1. For a universal joint as set forth, a member having a parti-spherical recess in its interior to conform with the spherical curvature of the ball, and its exterior shaped to slidably engage a guide slot; and having an opening in its side less in width than the diameter of the ball to permit the introduction of the ball into the member.

2. For a universal joint as set forth, a sleeve member having a parti-spherical recess in its interior to conform with the spherical curvature of the ball, and its exterior shaped to slidably engage a guide slot; and having an opening in its side of less diameter than the ball to permit the introduction of a ball; and a ball flattened at its poles to permit its introduction through the slot into the sleeve member.

3. For a universal joint, a U-shaped member having a parti-spherical recess to conform to the spherical curvature of a ball having flattened poles and having an opening in its side of less width than the greater diameter of the ball but of slightly greater width than the polar diameter of the ball, to permit the introduction of such a ball into the member.

4. A member externally adapted to slidably engage a guide and internally adapted to fit a ball, and having an opening in its side for the entry of a flattened ball of less diameter than the larger diameter of the ball.

5. A member having a parti-spherical recess to fit a ball and exteriorly fitted to engage a slot so as to be slidable therein, and having an opening in its inner side of less width than the major diameter of the ball but slightly greater in width than the polar diameter of the ball, to permit the introduction of the ball into the member; with a ball having flattened poles rotatably mounted in said member.

6. For a universal joint, an integral U-shaped member having a parti-spherical recess in its interior to conform with the spherical curvature of a ball, and having its exterior shaped to slidably engage a guide slot; and having an opening in one side of less width than the full diameter of the ball to permit the introduction of a flattened ball into the member; and having its side opposite the slot thinned, substantially as described.

In testimony that I claim the foregoing as my own, I affix my signature.

JOHN BENJAMIN FLICK.